(12) United States Patent
Kobierecki et al.

(10) Patent No.: US 11,673,645 B2
(45) Date of Patent: Jun. 13, 2023

(54) TRAILING EDGE FOR A COMPOSITE LIFTING SURFACE

(71) Applicant: AIRBUS OPERATIONS SL, Madrid (ES)

(72) Inventors: Robert Kobierecki, Madrid (ES); Alberto Balsa-Gonzalez, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 123 days.

(21) Appl. No.: 17/232,559

(22) Filed: Apr. 16, 2021

(65) Prior Publication Data
US 2021/0339847 A1 Nov. 4, 2021

(30) Foreign Application Priority Data
Apr. 29, 2020 (EP) .................................. 20382348

(51) Int. Cl.
*B64C 3/28* (2006.01)
*B64C 3/18* (2006.01)
*B64C 3/26* (2006.01)
*B64C 7/00* (2006.01)

(52) U.S. Cl.
CPC ................ *B64C 3/28* (2013.01); *B64C 3/185* (2013.01); *B64C 3/26* (2013.01); *B64C 7/00* (2013.01)

(58) Field of Classification Search
CPC .. B64C 3/28; B64C 3/185; B64C 3/26; B64C 7/00
See application file for complete search history.

(56) References Cited

U.S. PATENT DOCUMENTS

| 5,213,287 A * | 5/1993 | Barron ...................... B64C 9/00 244/199.4 |
| 5,622,336 A | 4/1997 | Chavanne et al. |
| 2007/0252040 A1* | 11/2007 | Kordel ...................... B64C 9/18 244/123.1 |
| 2010/0327121 A1* | 12/2010 | McAlinden ............... B64C 9/14 244/215 |

(Continued)

FOREIGN PATENT DOCUMENTS

| CN | 108 609 160 | 10/2018 |
| GB | 2 235 169 | 2/1991 |

OTHER PUBLICATIONS

Extended European Search Report for EP20382348.9, dated Oct. 26, 2020, 11 pages.

*Primary Examiner* — Brady W Frazier
*Assistant Examiner* — Nevena Aleksic
(74) *Attorney, Agent, or Firm* — Nixon & Vanderhye P.C.

(57) ABSTRACT

A trailing edge for a composite lifting surface is disclosed having a spar, an upper panel and a lower panel each having a free edge, a seal, and an elongated profile located on the panels following a spanwise direction of the trailing edge. An elongated profile including a web extending along the spanwise direction of the trailing edge, and having first and second flange portions, and a transition zone in between the first and second flange portions extending at different heights with respect to each other. The first flange portion is configured to hold at least a part of the seal underneath, and the second flange portion is configured to contact the panel so that the first flange portion secures the seal to the panel, and the second flange portion secures the elongated profile to the panel.

14 Claims, 3 Drawing Sheets

(56) References Cited

U.S. PATENT DOCUMENTS

| | | |
|---|---|---|
| 2011/0031349 A1 | 2/2011 | Wildman et al. |
| 2015/0266563 A1* | 9/2015 | Zeon .................. B64C 7/00 |
| | | 244/130 |
| 2016/0186866 A1 | 6/2016 | Foster et al. |
| 2017/0167610 A1* | 6/2017 | Blades ................ F16J 15/021 |
| 2017/0283034 A1 | 10/2017 | Balzer et al. |
| 2018/0155004 A1* | 6/2018 | Woolcock ............. B64C 3/26 |

* cited by examiner

TRAILING EDGE FOR A COMPOSITE LIFTING SURFACE

CROSS REFERENCE TO RELATED APPLICATION

This application claims priority to and incorporates by reference European Application Number EP 20382348-9, filed Apr. 19, 2020.

BACKGROUND

The present disclosure relates to a trailing edge of an empennage or wing structure. More specifically, the trailing edge is of the kind comprising a cell concept fully integrated in a multi-spar torsion box.

An aircraft lifting surface comprises a torsion box as its main supporting structure with a leading edge and a trailing edge attached to the torsion box, and additionally control surfaces such as flaps, rudders or elevators, attached to the trailing edge or to the leading edge.

The leading edge is attached to the front spar of the torsion box. The trailing edge is attached to the rear spar of the torsion box, and it allows control surface installation and movement to complete the aircraft lifting surface.

A known structural design for a torsion box is the multi-spar torsion box. The multi-spar torsion box comprises multiple spars running spanwise. The spars comprise, in turn, at least a flange and a web, creating closed cells.

The torsion box comprises upper and lower skin panels, which are the elements closing the whole torsion box at the upper and lower parts.

The trailing edge is a free edge behind the last spar of the torsion box, and it comprises upper and lower skin panels, a removable sealing profile in the interface with the control surface, and installation parts. Because of systems, equipment and control surface installation, the trailing edge comprises removable access panels. The sealing profile is usually installed by a removable metallic profile.

The access panels have to fulfil some requirements:
Aerodynamic requirements, such as low air resistance.
Resistance to aerodynamic forces.
Strength and rigidity requirements to avoid buckling and significant deformation.

A conventional trailing edge panel, i.e., a panel of a non-integrated trailing edge, is reinforced by using a sandwich structure.

An integrated structure is one in which the different structural elements subjected to different stresses (shearing stress, normal stress etc.) are manufactured at one time or one-shot or start from a single piece of material.

A trailing edge of a multi-spar integrated lifting surface is manufactured in a one-shot process, thus it is monolithic, and access panels cannot be reinforced by a sandwich structure.

In case of monolithic panels, it is necessary to increase the thickness to guarantee appropriate stiffness of the panels. But in thin and slim elements, like the trailing edge panels, thickness increasing has to be very significant.

A multi-spar trailing edge analysis shows the biggest deformation is always produced on the free edge of the trailing edge. And the buckling shape of the lower panels shows that the beginning of buckling is also produced in the free edge of the panels. The analysis shows that the most loaded area of the trailing edge panel is just next to the free edge.

Additionally, it is also known that a multi-spar cell concept is based in spars made through C-shape composite forms, being extended the spar flanges of the C-shape composite forms along the skin chordwise direction in a cross-section of the trailing edge.

Because of the multi-spar design guidelines, there are only two patterns of fiber plies permitted in the last cell of the trailing edge. Other patterns are forbidden due to hot-forming and moulding processes because all layers have to start on the spar, otherwise they move during the manufacturing process.

Specifically, patterns having a C-shape or having a L-shape can be employed. As a result, in this kind of trailing edge reinforcement, some parts of the cells have to be oversized and, as a result, the entire trailing edge is oversized, increasing material, labour cost and weight.

SUMMARY

Accordingly, the disclosure provides a trailing edge for a composite lifting surface. The trailing edge is of the kind that comprises at least a spar extended along the spanwise direction of the trailing edge, and upper and lower panels extending from the spar—consisting either separate panels extending from the mentioned spar or the same panels forming an integrated trailing edge—.

The upper and lower panels comprise four edges. They comprise a free edge in the edge opposite to the edge adjacent to the spar in the chordwise direction of the trailing edge. The free edge of the panel is created due to the opening of the trailing edge configured for attaching the control surfaces.

The trailing edge also may comprise a seal mounted to seal a movable control surface against the panel, closing the gap between them.

According to an exemplary embodiment, the trailing edge further comprises an elongated profile joined to the upper and/or lower panels.

Elongated profile is interpreted in the present invention as a long and thin profile. Profile means a hot rolled/extrusion/die forming/forging shape to be cut in a sheet of material such as laminated plastic, aluminum alloy or steel plate.

The elongated profile is located on the upper and/or lower panels following the spanwise direction of the trailing edge, between the spar and the upper and/or lower panels' free edge, and closer to the free edge than to the spar.

The profile comprises a web, and first and second flange portions having a transition zone in between. The web is extended along the spanwise direction of the trailing edge, perpendicular to the plane defined by the panel. First and second flange portions are extended at different heights with respect to each other. The first flange portion is configured to hold at least a part of the seal underneath, and the second flange portion is configured to contact the panel. The first flange portion fixing the seal to the panel, and the second flange portion fixing the elongated profile to the panel.

The present invention encompasses stiffening the trailing edge monolithic panels with the same profile used to fix aerodynamic seal. A multifunctional profile is provided for monolithic panels, i.e., panels manufactured in a one-shot process with a multi-spar structure, instead of increasing the thickness of the panels as known from the state of the art.

Accordingly, the claimed invention allows the panels to be stiffened without increasing their thickness, and without the need to add a sandwich structure. Additionally, the invention provides a structure that allows the seals to be replaced without having to remove the profile.

All panels are always supported on three edges of their four edges by trailing edge ribs and spars or hinge and have one free edge. In case of thickness increasing the whole panel is reinforced in the same rank and over dimensioned in also the less loaded areas as previously explained.

Additionally, the elongated profile is able to fix other elements, like a seal.

The trailing edge of the invention comprises the following advantages:

- To allow the manufacturing of the trailing edge in one-shot with a multispar structure and at the same time providing the adequate stiffness to the trailing edge panels.
- Less number of parts involved.
- Possibility to use the profile as electrical bonding strap.
- Weight reduction.
- Cost reduction.

The moment of inertia of the rectangular part of the profile—first and second flange portions—rises with its height. And it is more effective when the distance of the web of the profile to the free edge of the panel decreases.

As previously stated, the trailing edge object of the invention may be integrated.

According to an exemplary embodiment, a composite lifting surface is disclosed comprising a leading edge, a torsion box, and a trailing edge attached to the torsion box and according to the described above is disclosed.

According to an exemplary embodiment, an aircraft comprising a composite lifting surface according to the above is disclosed.

BRIEF DESCRIPTION OF THE DRAWINGS

To complete the description and in order to provide for a better understanding of the invention, a set of drawings is provided. Said drawings form an integral part of the description and illustrate exemplary embodiments of the invention. The drawings comprise the following figures.

DETAILED DESCRIPTION OF SOME EMBODIMENTS

Some embodiments will now be described with reference to the Figures.

Figure 1:
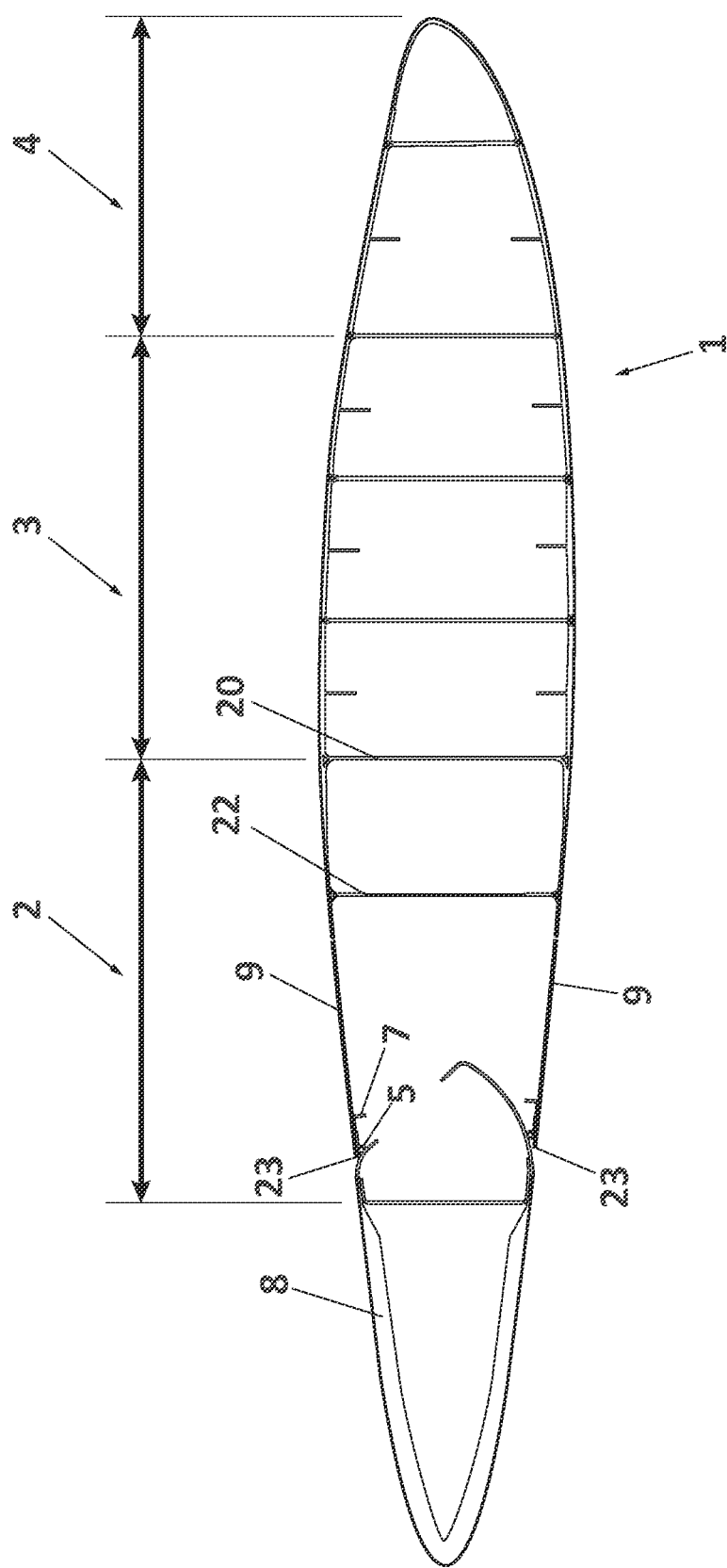
FIG. 1 illustrates a schematic cross-section view of an aircraft lifting surface having a trailing edge in accordance with an exemplary embodiment.

FIG. 1 discloses an aircraft lifting surface 1 comprising a torsion box 3, as its main supporting structure, with a leading edge 4 and a trailing edge 2 attached to the torsion box 3. Control surfaces 8 such as flaps, rudders or elevators, are also attached to the trailing edge 2 as in this case.

FIG. 1 also discloses the trailing edge 2 comprising a spar 22 located in the spanwise direction of the trailing edge 2, substantially parallel to the torsion box rear spar 20 in the illustrated section. FIG. 1 also discloses upper and lower panels 9 extending towards the trailing edge spar 22, and comprising a free edge 23 in an edge opposite to the edge of the panel 9 that is closer to the trailing edge spar 22.

As shown in FIG. 1, the trailing edge 2 also comprises a seal 5 configured for sealing a control surface 8 against the upper and lower panels 9. The seal 5 is joined by an elongated profile 7 to the upper and lower panels 9 in the proximity of their free ends 23.

Figure 2:
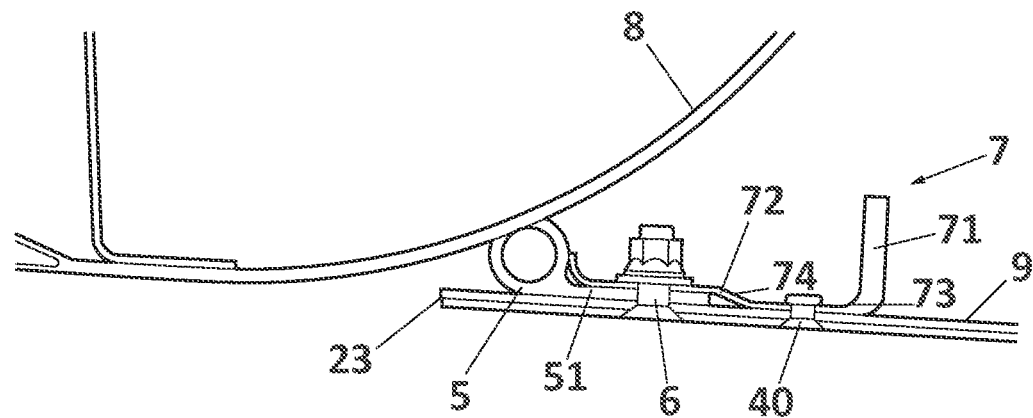
FIG. 2 illustrates a detailed view of a trailing edge in accordance with an exemplary embodiment.
Figure 3:
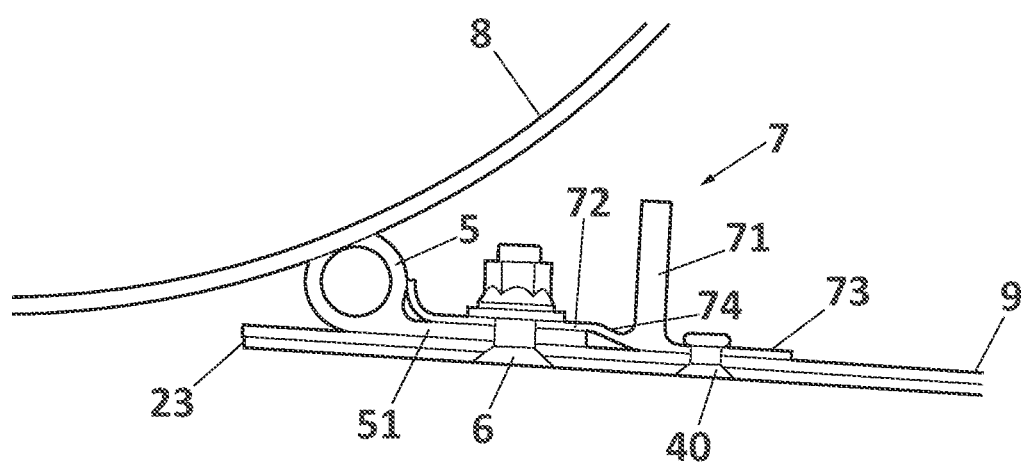
FIG. 3 illustrates a detailed view of a trailing edge in accordance with an exemplary embodiment.

Referring to FIGS. 2 and 3, two exemplary embodiments of the elongated profile 7 are illustrated and will be explained in greater detail. The elongated profile 7 is mounted on the upper and/or lower panels 9, between the trailing edge spar 22 and the panel's free edge 23, following the spanwise direction of the trailing edge 2. The elongated profile 7 is located closer to the free edge 23 than to the trailing edge spar 22.

The elongated profile 7 comprises a web 71, first and second flange portions 72, 73, and a transition zone 74 in between. The web 71 is extended along the spanwise direction of the trailing edge 2, perpendicular to the plane defined by the panel 9. The first and the second flange portions 72, 73 are extended at different heights with respect to each other—also, with respect to the web 71, and to the planes defined by the panels 9.

The first flange portion 72 is configured to hold at least a part of the seal 5 underneath, and the second flange portion 73 is configured to contact the panel 9. The first flange portion 72 fixes the seal 5 to the panel 9, and the second flange portion 73 fixes the elongated profile 7 to the panel 9.

The elongated profile 7 is located between the panel's free edge 23 and ⅓ of the chordwise length of the panel 9 from the panel's free edge 23. Therefore, it is located such that the web 71 is located in the most loaded area.

In the shown embodiments, the chordwise length of the elongated profile 7—its shortest dimension—is between 5% and 15% of the chordwise length of the panel 9.

Additionally, in the shown embodiments, the height of the web 71 is approximately 5% of the chordwise length of the panel 9, enough to stiff the panel avoiding buckling phenomenon.

FIG. 2 shows a first embodiment of the elongated profile 7 in which first and second flange portions 72, 73 are extended contiguous, along the chordwise direction of the trailing edge 2. In this case, the web 71 is located at the end of the elongated profile 7, close to the trailing edge spar 22.

FIG. 3 shows a second embodiment of the elongated profile 7 in which the web 71 is located between the first and second flange portions 72, 73.

FIGS. 2 and 3 show a transition zone 74 consisting of a slope, but other configurations could be also used.

The trailing edge may further comprise removable fasteners 6 to fix the first flange portion 72 and the seal 5 to the panel 9. This way, the seal 5 can be replaced when needed.

In addition, the trailing edge 2 may further comprise rivets 40 to fix the second flange portion 73 to the panel 9. The rivet 40 may be, for example, but not limited to, solid, hi-lock, or hi-lite rivets.

As an advantage, the use of different type of fasteners to fix the elongated profile avoids disassembling the entire profile when the seal has to be replaced. This saves time and reduces cost.

As previously stated, the trailing edge 2 comprises a seal 5, which is configured for sealing the control surface 8 against the panel 9. The seal 5 is joined to the upper and/or lower panel 9 of the trailing edge 2 by the first flange portion 72 of the elongated profile 7. Thus, the elongated profile 7 is also used for helping to fix the seal 5 to the panel 9.

In an embodiment, the seal 5 is made of rubber.

According to an exemplary embodiment, the seal 5 may comprise a lengthened extension 51 extending parallel to the panel 9. The seal 5 may have a "P" or an "I" cross-section shape.

The stiffness of the elongated profile 7 is more effective when the distance of the web 71 to the free edge 23 of the panel 9 decreases. Therefore, the embodiment of FIG. 3 optimize the effect of the elongated profile 7.

In an embodiment, the elongated profile 7 extends along the whole span of the panel 9.

The elongated profile 7 may be metallic.

Referring to FIG. 1, the lifting surface may be a composite lifting surface 1 having a leading edge 4, a torsion box 3, a trailing edge 2 attached to the torsion box 3, the composite lifting surface 1 including a trailing edge 2 as described hereinabove.

Figure 4:
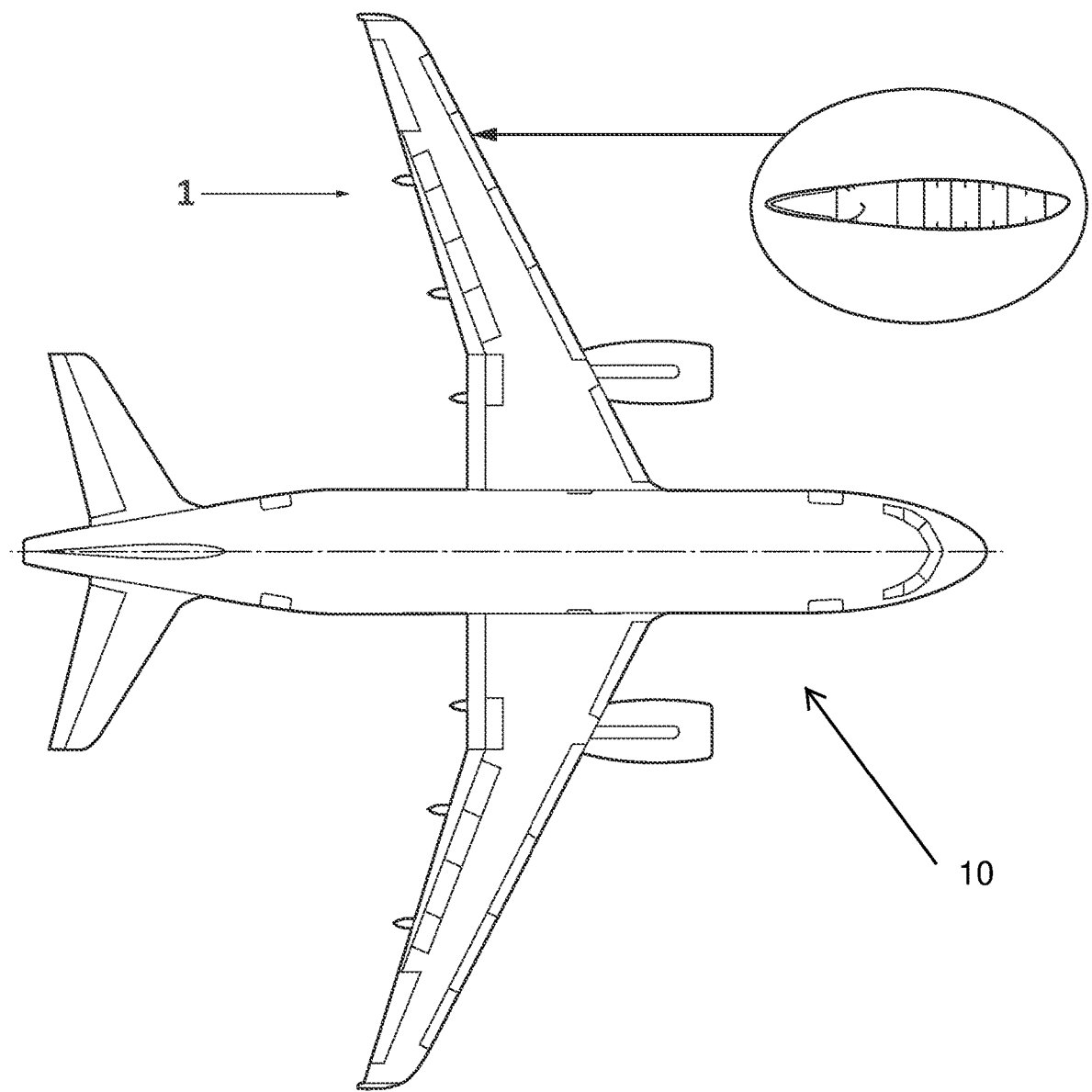
FIG. 4 illustrates an aircraft having a lifting surface with a trailing edge in accordance with an exemplary embodiment.

FIG. 4 discloses an aircraft 10 comprising a composite lifting surface 1 according to the above.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A trailing edge assembly for a composite lifting surface, comprising:
    a spar extended along a spanwise direction of the lifting surface;
    a panel extending from the spar and comprising a trailing edge distal from the spar, wherein the panel comprises an upper or a lower panel;
    a seal mounted to seal a control surface against the panel; and,
    an elongated profile located on the panel following the spanwise direction of the trailing edge, between the spar and the upper and/or lower panels trailing edge and closer to the trailing edge than to the spar, the elongated profile comprising:
        a web extended along the spanwise direction of the trailing edge and perpendicular to the plane defined by the panel; and,
        first and second flange portions having a transition zone in between to extend the first and the second flange portions at different heights with respect to each other, the first flange portion configured to hold at least a part of a lengthened extension of the seal extending parallel to the panel and between the first flange portion and the upper and/or lower panels, and the second flange portion is configured to contact the upper and/or lower panels, the first flange portion fixing the seal to the panel, and the second flange portion fixing the elongated profile to the panel.

2. The trailing edge assembly according to claim 1, wherein the elongated profile is located between the trailing edge of the panels and ⅓ of the a chordwise length of the panel from said panels trailing edge.

3. The trailing edge assembly according to claim 1, wherein the chordwise length of the elongated profile is between 5% and 15% of a chordwise length of the panel.

4. The trailing edge assembly according to claim 1, wherein the height of the web is approximately 5% of a chordwise length of the panel.

5. The trailing edge assembly according to claim 1, wherein the first and second flange portions are extended contiguous along the chordwise direction of the trailing edge.

6. The trailing edge assembly according to claim 5, wherein the web is located at the end of the elongated profile, close to the spar.

7. The trailing edge assembly according to claim 1, wherein the web is located between the first and second flange portions.

8. The trailing assembly edge according to claim 1, further comprising removable fasteners fixing the first flange portion and the seal to the panel.

9. The trailing edge assembly according to claim 1, further comprising rivets fixing the second flange portion to the panel.

10. The trailing edge assembly according to claim 1, wherein the seal has a "P" cross-section shape.

11. The trailing edge assembly according to claim 1, wherein the elongated profile extends along the whole span of the panel.

12. A composite lifting surface, comprising:
    a leading edge, a torsion box, and a trailing edge attached to the torsion box, wherein the composite lifting surface comprises the trailing edge assembly according to claim 1.

13. An aircraft, comprising a composite lifting surface according to claim 12.

14. A trailing edge assembly for an aircraft lifting surface, comprising:
    a spar extending along a spanwise direction of the trailing edge;
    a panel extending from an upper edge and a lower edge of the spar at one end, respectively, wherein the panel comprises an upper or a lower panel, and the panel having a free edge adjacent the spar;
    a seal having a first end attached to a control surface and an opposing lengthened extension attached to the upper or lower panel;
    an elongated profile having a web extending along the spanwise direction of the trailing edge and perpendicular to a surface of the panel, a first flange portion and a second flange portion, wherein the first flange portion extending from the web at one end and attached to a transition portion disposed between the first flange and the second flange portions, wherein the first flange portion and the second flange portion are different height levels relative to one another;
    wherein the lengthened extension of the seal is secured between the first flange portion and the panel;
    wherein the second flange portion is configured to contact the panel;
    wherein the first flange portion is configured to secure the seal to the panel, and the second flange portion is configured to secure the elongated profile to the panel; and, wherein the seal is secured to the panel in the spanwise direction of the trailing edge between the trailing edge spar and proximate to the trailing edge of the panel.

* * * * *